United States Patent [19]

Dupont et al.

[11] Patent Number: 5,055,518

[45] Date of Patent: Oct. 8, 1991

[54] ETHYLENICALLY UNSATURATED CARBAMATES AND COATING COMPOSITIONS

[75] Inventors: William A. Dupont, Wilbraham; George E. Sheldrick, North Oxford, both of Mass.

[73] Assignee: Monsanto Company, St. Louis, Mo.

[21] Appl. No.: 389,078

[22] Filed: Aug. 3, 1989

[51] Int. Cl.$^5$ ............................................. C08F 8/00
[52] U.S. Cl. .................................... 525/59; 525/278; 525/452
[58] Field of Search ....................... 525/452, 59, 278

[56] References Cited

U.S. PATENT DOCUMENTS

| | | | |
|---|---|---|---|
| 3,749,592 | 7/1973 | Gaske et al. | 117/62 |
| 3,782,950 | 1/1974 | Ranz | 96/85 |
| 4,233,425 | 11/1980 | Terfertiller et al. | 525/455 |
| 4,565,857 | 1/1986 | Grant | 527/301 |
| 4,609,706 | 9/1986 | Bode et al. | 527/7.4 |
| 4,654,233 | 3/1987 | Grant et al. | 427/379 |
| 4,839,230 | 6/1989 | Cook | 428/423.1 |

FOREIGN PATENT DOCUMENTS 61-59621  3/1986  Japan ................................. 525/59

*Primary Examiner*—Melvyn I. Marquis
*Assistant Examiner*—W. R. H. Clark
*Attorney, Agent, or Firm*—R. Bruce Blance; William J. Farrington; Richard H. Shear

[57] ABSTRACT

Ethylenically unsaturated carbamates are prepared by reaction of unsaturated isocyanates with the hydroxy groups of polyvinyl acetals. The ethylenically unsaturated carbamates either alone or formulated with unsaturated co-reactants such as (meth)-acryloyl monomers and oligomers, maleates and fumarates provide radiation curable coating compositions.

15 Claims, No Drawings

ETHYLENICALLY UNSATURATED CARBAMATES AND COATING COMPOSITIONS

This invention relates to ethylenically unsaturated oligomers and their use in coatings and in particular it relates to ethylenically unsaturated carbamates of polyvinyl acetals and their use in radiation-curable coating compositions.

Conventional lacquers for wood furniture have utilized nitrocelluloses and cellulose esters as the resin component. These lacquers provide high gloss coats but are generally deficient in solvent resistance and scratch resistance. These deficiencies have been addressed by modifying the nitrocelluloses and cellulose esters with ethylenic unsaturation to allow the coatings to be applied to wood surfaces to form thermoplastic films which can be repaired, rubbed or buffed in conventional fashion to provide the quality finish required for saleability. Then by irradiation with ultraviolet light or electron beam, the coatings are converted to the solvent resistant, physically tough form which is preferred for enhanced durability.

Such unsaturated nitrocelluloses and cellulose esters have been formed by reaction with acryloyl and acrylamide compounds. However, they have been found deficient in many aspects. In some instances, a high level of unreacted isocyanate has posed a toxic hazard in the spray application of the lacquer. The resins are incompatible with many of the co-reactants which are used to enhance the degree of radiation cure and thus the choice of co-reactant is limited. They provide coatings which are often deficient in sandability and when the coatings are cured by irradiation, they are deficient in solvent resistance, stain resistance, hydrolysis resistance or impact resistance. They are limited in use to coating of wood surfaces and are generally undesirable for plastic substrates since they impair the impact resistance of such substrates.

The present invention provides ethylenically unsaturated carbamates of polyvinyl acetals which are prepared by the reaction of the copolymers with unsaturated isocyanates selected from the group consisting of vinyl isocyanates, isocyanatoalkyl acrylates, isocyanatoalkyl methacrylates, and aralkyl isocyanates.

Other aspects of the invention are directed to coating compositions comprising the ethylenically unsaturated carbamates of polyvinyl acetals, substrates coated with the coating compositions and substrates coated with the radiation cured coatings. The coating compositions may further comprise essentially non-volatile $\alpha,\beta$-ethylenically unsaturated co-reactants to enhance the radiation curability.

The present invention further provides a process for the preparation of the ethylenically unsaturated carbamates and a method of providing a substrate with a coating comprising applying to the substrate a coating composition comprising an ethylenically unsaturated carbamate of a polyvinyl acetal, drying the coating composition to remove solvent and curing the dried coating by exposing it to ultraviolet radiation or an electron beam. The dried coating may optionally be sanded, buffed or repaired prior to radiation curing to provide a glossy, tough, durable, defect-free finish.

As employed herein, the term "polyvinyl acetal" is intended to be used in a generic sense meaning the reaction product under acidic conditions of polyvinyl alcohol (i.e., an at least partially hydrolyzed polyvinyl ester) with at least one $C_1$ to $C_7$ aldehyde and not in the specific sense of solely the reaction product of polyvinyl alcohol with acetaldehyde. Such a species is, of course, within the scope of this invention. The polyvinyl ester is the ester of a $C_1$ to $C_3$ carboxylic acid. Included among those polyvinyl acetals which may be employed in this invention may be listed the reaction products of polyvinyl alcohol with formaldehyde (polyvinyl formal), acetaldehyde, propionaldehyde, butyraldehyde (polyvinyl butyral), pentanal, methyl pentanals, hexanal, cyclohexane- carbaldehyde and benzaldehyde. Polyvinyl formal and polyvinyl butyral have the advantage of being readily available on a commercial scale.

The polyvinyl acetal employed in the practice of this invention advantageously has a vinyl acetal content in the range of about 60 to 95 weight percent, a vinyl alcohol content of from about 5 to about 30 weight percent and a residual acetate content of less than about 10 weight percent, based on the total resin weight. Especially preferred are polyvinyl acetals with a vinyl alcohol content of from about 14 to about 22% and a residual acetate content of from about 1.0 to about 5.0%. The number average molecular weight of the polyvinyl acetal may range from about 10,000 to about 70,000 daltons with a preferred range of about 15,000 to about 50,000 daltons.

Useful isocyanates for addition to the polyvinyl acetal include vinyl isocyanates, isocyanatoalkyl acrylates and methacrylates and a variety of aralkyl monoisocyanates. Specific isocyanates include vinyl isocyanate, isopropenyl isocyanate, 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinylbenzene, 1-(1-isocyanatoethyl)-4-vinylbenzene, 1-(1-isocyanato-1-methylethyl)-3-(1-methylethenyl) benzene and 1-(1-isocyanato-1-methylethyl)-4-(1-methylethenyl) benzene.

The preferred isocyanates are 2-isocyanatoethyl acrylate, 2-isocyanatoethyl methacrylate, 1-(1-isocyanato-1-methylethyl)-3-(1-methylethenyl) benzene and 1-(1-isocyanato-1-methylethyl-4-(1-methylethenyl)benzene.

The reaction of the unsaturated isocyanate with the polyvinyl acetal is conveniently carried out in an anhydrous solution in any solvent which is inert to an isocyanate such as an ester, a ketone, a cyclic ether or a chlorinated hydrocarbon to provide a resin concentration in the range of about 10 to 50 weight percent preferably about 15 to 35 weight percent, and in the presence of a catalytic amount of a suitable catalyst such as a tertiary amine for example triethylenediamine or a tin compound for example stannous octoate, dibutyltin diacetate, dibutyltin dioctoate or dibutylin dilaurate. Advantageously, the reaction is carried out at a temperature in the range of about 20° to 150° C., the temperature selected being dependent on the reactivity of the isocyanate. For example when 2-isocyanatoethyl methacrylate is the isocyanate used for reaction with the polyvinyl acetal, the temperature is preferably in the range of about 20° to 50° C., while for 1(1-isocyanato-1-methylethyl)-3-(1-methylethenyl)benzene, the temperature is preferably in the range of about 100° to 150° C. The solution of the reaction product can provide the coating composition of the present invention. Alternatively the unsaturated carbamate can be recovered by stripping the solvent to provide 100 percent resin solids which can then be dissolved in a solvent such as an alcohol whose presence is prohibited at the isocyanate reaction stage.

While stoichiometric quantities of isocyanate and polyvinyl acetal can be used in the reaction, it is generally advantageous to use no more than about 98 percent of the stoichiometric quantity of isocyanate to ensure that essentially no unreacted isocyanate remains in the ethylenically unsaturated carbamate product. Advantageously sufficient isocyanate is used to react with from 10 to 100 percent of the alcohol groups of the polyvinyl acetal and preferably sufficient to react with 50 to 90 percent of the alcohol groups. Properties of the ethylenically unsaturated carbamates can be modified by reacting a portion of the hydroxyl groups of the polyvinyl acetal with other reagents to increase such properties as hardness, flexibility and solvent resistance.

The coating composition of the present invention is advantageously applied as a solution to a suitable substrate such as wood, plastic, metal, ceramic, and the like by spraying, dipping, brushing, curtain coating or by another such method. After coating, the solvent is allowed to evaporate, aided by heat or forced air when necessary, until the coating is dry. At this stage the coating can be repaired for sanding, buffing and polishing. The coating composition of the present invention is characterized as non-air-drying, i.e. it is incapable of cure by absorption of oxygen into the composition in the manner that air-drying alkyds are conventionally cured. This intermediate stage is then cured to achieve solvent and abrasion resistance by exposure to radiation.

When irradiation is ultraviolet, a photopolymerization initiator facilitates the curing step. Such initiators include acyloin and derivatives thereof, such as benzoin, benzoin methyl ether, benzoin ethyl ether, benzoin isopropyl ether, benzoin isobutyl ether, and 2-hydroxy-2-methyl-1,2-diphenylethanone; diketones such as benzil and diacetyl, etc; phenones such as acetophenone, 2,2,2-tribromo-1-phenylethanone, 2,2-diethoxyacetophenone, 2,2-dimethoxy-2-phenylacetophenone, methyl benzoyl formate, 2,2,2-tribromo-1-(2-nitrophenyl)ethanone, benzophenone, and 4,4'-bis(dimethylamino)benzophenone, and 1-hydroxycyclohexyl phenyl ketone. Normally, the initiator is used in amounts ranging from about 0.01 to 10% by weight of the total polymerization composition. When the quantity is less than 0.01% by weight, the polymerization rate becomes extremely low. If the initiator is used in excess of about 10% by weight, no correspondingly improved affect can be expected. Thus, addition of such greater quantity is not economically justified. Preferably, about 0.25 to 5% of initiator is used in the polymerizable composition.

The photopolymerization of the composition of the invention occurs on exposure of the composition to any source of radiation emitting actinic radiation at a wavelength within the ultraviolet and visible spectral regions. Suitable sources of radiation include mercury, xenon, carbon arc and tungsten filament lamps. Exposures may be from less than about one second to ten minutes or more depending upon the amounts of particular polymerizable materials, the photopolymerization catalyst being utilized, the radiation source, the distance of the composition from the source and the thickness of the coating to be cured. The compositions may also be polymerized by exposure to electron beam irradiation. Generally speaking, the dosage necessary is from less than 1 megarad to 30 megarads or more. An advantage of curing with electron beam irradiation is that highly pigmented compositions can be effectively cured at a faster rate than by mere exposure to actinic radiation.

The radiation curable compositions of this invention and optional polymerization initiator can, but do not have to be, formulated with polymerizable $\alpha,\beta$-ethylenically unsaturated modifying monomers to enhance the cure rate and the properties of the coatings, e.g., hardness, flexibility, and adhesion. Such monomers may also be used as reactive diluents. Suitable ethylenically unsaturated monomers which can be used are essentially non-volatile ethylenically unsaturated esters and amides. The term "essentially non-volatile" connotes a substance of vapor pressure less than about 130 Pa at 20° C. Monomers which can be included in the coating composition, are advantageously of number average molecular weight less than about 4000 daltons, and unsaturation equivalent weight of less than about 1000 daltons and contain at least about 2 ethylenically unsaturated groups per molecule. Such monomers include maleic and fumaric polyesters formed by reaction of maleic anhydride or acid or fumaric acid with polyol and include (meth)-acrylic esters and amides. Typical (meth)-acrylic esters and amides are represented by the formula

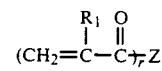

where $R_1$ is selected from the group consisting of H and $CH_3$, r is an integer in the range of 1 to 10, preferably in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone. Such monomers may be obtained by reaction of acryloyl or methacryloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxylic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include isobornyl acrylate, 1,3-butylene glycol diacrylate, 1,6-hexanediol diacrylate, the polyacrylates and polymethacrylates of polyethyleneoxy diols and polyols, polypropyleneoxy diols and polyols and poly(tetramethyleneoxy) diols and polyols of molecular weight in the range of 100 to 4000 daltons, pentaerythritol tetraacrylate, trimethylolpropane triacrylate, dipentaerythritol monohydroxypentaacrylate, ethoxylated bisphenol A dimethacrylate, the diacrylates and dimethacrylates of epoxy compounds formed from bisphenol A and epichlorohydrin of molecular weight in the range of 200 to 4000 daltons, the polyacryloyl monomers prepared by reacting isocyanate capped polyethers and isocyanate capped polyesters of molecular weight up to 4000 daltons with hydroxyethyl (meth)-acrylate, and the polyacryloyl monomers prepared by reacting (meth)acrylic acid, (meth)-acrylamide or hydroxyethyl (meth)-acrylate with polymethoxyalkyl amino resins such as hexamethoxymethyl melamine.

In general the amount of reactive diluent used with the ethylenically unsaturated carbamate derived from the polyvinyl acetal is selected to increase the cure rate and enhance the properties of the coatings both in the uncured and the cured state. Advantageously as much as fifty percent or more of the total weight of unsaturated carbamate and reactive diluent can be provided by the reactive diluent. However, preferably at least sixty percent is provided by the unsaturated carbamate. The compositions of the invention can also include (besides the monomers, oligomers, and resins mentioned above), a variety of additives utilized for their known purposes, such as stabilizers, inhibitors, lubricants, flexibilizers, pigments, dyes, and fillers such as finely divided silica, diatomaceous earth, metal oxides, fiberglass, glass bubbles, and talc. Fillers can generally be used in proportions up to about 200 percent by weight of the curable composition but preferably are used up to about 50 percent by weight. It is desirable that the above optional additives be transparent to the radiation.

The coating compositions of the present invention comprising the ethylenically unsaturated carbamate derived from the polyvinyl acetal and when required a photopolymerization initiator and other optional ingredients, are generally prepared by simple mixing in the desired proportions. The solvent used is usually the solvent in which the ethylenically unsaturated carbamate is prepared, e.g., a ketone, an ester, a cyclic ether or a chlorinated hydrocarbon.

The following examples are set forth to illustrate the invention but are not meant to limit it. Parts and percentages are by weight unless otherwise indicated.

PREPARATION OF ETHYLENICALLY UNSATURATED CARBAMATES OF POLYVINYL ACETALS

EXAMPLE 1

1000 parts by weight of a polyvinyl butyral of number average molecular weight 20,000 comprising 87 weight percent vinyl butyral units, 12 weight percent vinyl alcohol units and 1 weight percent vinyl acetate units (sold by Monsanto Company under the registered trademark Butvar B-79) and 1.08 parts of 2,6-di-t-butyl-4-methyl phenol are dissolved in 5000 parts by weight of refluxing methyl isobutyl ketone, and then 1200 parts by weight of the ketone is distilled removing any water azeotropically. The solution is cooled to about 25° C. Dibutyltin diacetate (8.71 parts by weight) is added as a 10% solution in toluene and stirred in. 307 parts by weight of 2-isocyanatoethyl methacrylate hereinafter referred to as IEM (0.81 equivalent to 1 equivalent of polyvinyl butyral) is added at a steady rate over a period of 2 hours to the stirred solution of polyvinyl butyral. After 5 hours, infrared analysis showed that the isocyanate has completely reacted. The resin solids content is 24.8% and its viscosity is 300 cps. The unsaturation equivalent weight of the unsaturated carbamate is 644.

EXAMPLE 2

Example 1 is repeated using a polyvinyl butyral of number average molecular weight 15,000, comprising 80 weight percent vinyl butyral units, 19 weight percent vinyl alcohol units and 1 weight percent vinyl acetate units (sold by Monsanto under the registered trademark Butvar B-98). 0.64 equivalents of IEM is reacted with 1 equivalent of the polyvinyl butyral. The resin solids content of the final solution is 25.5 percent and the viscosity is 400 cps. The unsaturated equivalent of the carbamate is 517.

EXAMPLE 3

Example 1 is repeated using a polyvinyl formal of number average molecular weight 15,900 comprising 82 weight percent vinyl formal units, 6 weight percent vinyl alcohol units, and 12 weight percent vinyl acetate units, (sold by Monsanto under the registered trademark Formvar 5/95E). 0.9 equivalent of IEM is reacted with 1 equivalent of the polyvinyl formal in ethylene dichloride solution. The resin solids content of the final solution is about 25 percent and the unsaturation equivalent is about 870.

EXAMPLE 4

500 parts by weight of the polyvinyl butyral of Example 2 and 0.5 parts by weight of 2,6-di-t-butyl-4-methylphenol are dissolved in 2800 parts of refluxing methyl isobutyl ketone. 500 parts of the ketone are distilled removing water azeotropically, and the solution is cooled. 445 parts of tetrahydrofuran are added when the temperature reaches 48° C. At 42° C., 4.35 parts of a 10% solution of dibutyltin diacetate in toluene is added. At 33° C., 300 parts of 1-(1-isocyanato-1-methylethyl)-3-(1-methylethenyl) benzene hereinafter IMB, (equivalent to 69 percent of the hydroxy groups of the polyvinyl butyral) is added and the solution is maintained at 25° C. for 5 days. Infrared analysis shows that consumption of the isocyanate is complete. The resin solids content of the final solution is 22.5 percent and the viscosity is 300 cps. The unsaturation equivalent of the carbamate resin is 537.

EXAMPLE 5

Example 4 is repeated with 0.61 equivalents of IMB to 1 equivalent of the polyvinyl butyral. The isocyanate is added to the solution at 50° C. and the solution is maintained at this temperature for five hours and then it is allowed to cool to ambient temperature and maintained at ambient temperature for 16 hours. Infrared analysis shows almost complete consumption of isocyanate. The solution is then reacted with 0.39 equivalents of IEM to 1 equivalent of polyvinylbutyral. After 3 days, infrared analysis showed that consumption of the isocyanate is complete. The resin solids content of the solution is 24.6%. The viscosity is 300 cps. The unsaturation equivalent of the unsaturated carbamate product is 415.

COATING COMPOSITIONS

A coating composition is prepared by adding 0.75 parts of 1-hydroxycyclohexyl phenyl ketone sold by Ciba-Geigy under the registered trademark Irgacure 184 to 100 parts of the unsaturated carbamate of Example 1. The coating composition is drawn down on glass panels to provide dry films of 76 micron thickness which are force dried by heating for 15 minutes at 55° C. The dry film is sanded with no. 600 garnet paper and a solution of 33 parts vegetable oil, 33 parts mineral oil and 8 parts zinc stearate in 33 parts petroleum ether. No gumming of the paper occurs. The solvent resistance of the dried films measured by MEK double rubs is 45. The dried films are then subjected to UV radiation by passing them at a speed of 3.05 m per minute through a Radiation Polymer Company UV Processor Model QC-1202AN equipped with 2×200 watt 12 inch medium pressure mercury vapor lamps, providing an energy flux of 800 mjcm$^{-2}$. The solvent resistance increases to more than 100 without any marring of the film. The Tukon hardness is 15.4.

The irradiated films tested for stain resistance one day and 12 days after irradiation by applying a cotton ball of 6.35 mm diameter soaked in staining agent and placing a glass jar over the ball to minimize evaporation of volatile components of the staining agent. After 48 hours, the cotton ball is removed and the film is washed with soap and water, followed by isopropyl alcohol and examined for stain. No staining from orange juice, sauerkraut, or ketchup is observed. Slight staining occurs with Kiwi brown shoe polish on panels tested one day after irradiation, but no staining is observed with panels tested 12 days after irradiation. Very slight mustard staining occurs. Slight bubbling occurs with ethanol.

Blocking resistance is tested before and after UV cure. This test involves placing a piece of duck cloth on the panel, and on top of this is placed a 1 inch square of steel, and then a 1 kilogram weight. After 16 hours at ambient temperature, the panel is examined for an imprint of the duck cloth. This test determines if the coated substrates can be stacked on top of one another without blocking. The unirradiated panels show a clear imprint of the cloth. No marring or infrared occurred with the irradiated panels.

A "tea-cup" test is also conducted after UV cure. A flat-bottomed tea cup is placed on the irradiated coated panel, and boiling water is poured in. After 15 minutes, the panel is examined and shows no marring.

Condensing humidity test shows no loss of gloss after 5 days. Simulated accelerated exterior exposure in a QUV machine showed very little loss in gloss and a very slight yellowing of the film.

What is claimed is:

1. An ethylenically unsaturated carbamate derived from a poly(vinyl acetal) and an ethylenically unsaturated isocyanate selected from the group consisting of 1-(1-isocyanatoethyl)-3-vinyl-benzene, 1-(1-isocyanatoethyl)-4-vinylbenzene, 1-(1-isocyanato-1-methylethyl)-3-(1-methylethenyl)benzene and 1-(1-isocyanato-1-methylethyl)-4-(1-methylethenyl)benzene.

2. The ethylenically unsaturated carbamate of claim 1 wherein the poly(vinyl acetal) is the reaction product of a polyvinyl alcohol and $C_1$ to $C_7$ aldehyde, has a vinyl acetal content in the range of about 60 to about 95 weight percent, a vinyl alcohol content in the range of about 5 to about 30 weight percent and a vinyl ester content in the range of about 0 to about 10 weight percent and has a number average molecular weight in the range of about 10,000 to about 70,000 daltons, and wherein the vinyl ester is the ester of a $C_1$ to $C_3$ carboxylic acid.

3. The ethylenically unsaturated carbamate of claim 2 wherein the aldehyde is formaldehyde or butyraldehyde, wherein the vinyl acetal content is in the range of about 73 to about 85 weight percent, wherein the vinyl alcohol content is in the range of about 14 to about 22 weight percent, wherein the vinyl ester is vinyl acetate in the range of about 1 to about 5 weight percent and wherein the number average molecular weight is in the range of about 15,000 to about 50,000 daltons.

4. The ethylenically unsaturated carbamate of claim 1 wherein the isocyanate is 1-(1-isocyanato-1-methylethyl)-3-(1-methylethenyl)benzene.

5. The ethylenically unsaturated carbamate of claim 2 wherein from 10 to 100 percent of the hydroxy groups of the polyvinyl acetal have been reacted with isocyanate.

6. The ethylenically unsaturated carbamate of claim 5 wherein 50 to 90 percent of the hydroxy groups of the polyvinyl acetal have been reacted with isocyanate.

7. A non-air-drying radiation-curable coating composition comprising the ethylenically unsaturated carbamate derived from a polyvinyl acetal and an ethylenically unsaturated isocyanate selected from the group consisting of 1-(1-isocyanatoethyl)-3-vinyl-benzene, 1-(1-isocyanatoethyl)-4-vinylbenzene, 1-(1-isocyanato-1-methylethyl)-3-(1-methylethenyl)benzene and 1-(1-isocyanato-1-methylethyl)-4-(1-methylethenyl)benzene.

8. The coating composition of claim 7 wherein the polyvinyl acetal is the reaction product of a polyvinyl alcohol and $C_1$ to $C_7$ aldehyde, has a vinyl acetate content in the range of about 60 to about 95 weight percent, a vinyl alcohol content in the range of about 5 to about 30 weight percent and a vinyl ester content in the range of about 0 to about 10 weight percent and has a number average molecular weight in the range of about 10,000 to about 70,000 daltons, and wherein the vinyl ester is the ester of a $C_1$ to $C_3$ carboxylic acid.

9. The coating composition of claim 8 wherein the aldehyde is formaldehyde or butyraldehyde, wherein the vinyl acetal content is in the range of about 73 to about 85 weight percent, wherein the vinyl alcohol content is in the range of about 14 to about 22 weight percent, wherein the vinyl ester is vinyl acetate in the range of about 1 to about 5 weight percent and wherein the number average molecular weight is in the range of about 15,000 to about 50,000 daltons.

10. The coating composition of claim 7 wherein the isocyanate is 1-(1-isocyanato-1-methylethyl)-3-(1-methylethenyl)benzene.

11. The coating composition of claim 8 wherein from 10 to 100 percent of the hydroxy groups of the polyvinyl acetal have been reacted with isocyanate.

12. The coating composition of claim 11 wherein 50 to 90 percent of the hydroxy groups of the polyvinyl acetal have been reacted with isocyanate.

13. The coating composition of claim 8 further comprising an essentially non-volatile $\alpha,\beta$-ethylenically-unsaturated co-reactant of number average molecular weight less than about 4,000 daltons.

14. The coating composition of claim 13 wherein the $\alpha,\beta$-ethylenically unsaturated co-reactant has an unsaturation equivalent weight of less than 1000 daltons and is a maleic or fumaric ester or a (meth)-acrylic ester or amide containing at least about 2 $\alpha,\beta$-ethylenically unsaturated groups per molecule.

15. The coating composition of claim 14 wherein the (meth)-acrylic ester or amide is represented by the formula

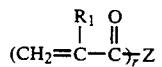

where $R_1$ is selected from the group consisting of H and $CH_3$ where r is an integer in the range of 1 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, containing a hydrocarbon, ester, amide, ether, urethane or amino resin backbone.

* * * * *

UNITED STATES PATENT AND TRADEMARK OFFICE
CERTIFICATE OF CORRECTION

PATENT NO.   : 5,055,518
DATED        : October 8, 1991
INVENTOR(S)  : William A. Dupont and George E. Sheldrick It is certified that error appears in the above–identified patent and that said Letters Patent is hereby corrected as shown below:

Column 3, line 23, delete the sentence "At this stage the coating can be repaired for sanding, buffing and polishing.", and insert the sentence --At this stage the coating can be repaired for example by removal with solvent and recoating, or by sanding, buffing and polishing.--

Signed and Sealed this

Twenty-sixth Day of January, 1993

Attest:

STEPHEN G. KUNIN

*Attesting Officer*    Acting Commissioner of Patents and Trademarks